Jan. 5, 1943.  L. F. LEFKE  2,307,519

MEAT BLOCK BRUSH

Filed July 12, 1941

Inventor
Lewis F. Lefke.

By
Samuel H. Davis.
Attorney

Patented Jan. 5, 1943

2,307,519

UNITED STATES PATENT OFFICE 2,307,519

MEAT BLOCK BRUSH

Lewis F. Lefke, Lansing, Mich., assignor of one-half to Frank W. Lefke, Lansing, Mich.

Application July 12, 1941, Serial No. 402,216

3 Claims. (Cl. 15—28)

This invention relates to meat block brushes, and is intended to be employed by butchers or hotels or like for cleaning particles from surfaces upon which meat has been chopped or cut. Usually a brush is employed, but this invention has in view the use of a knife scraper or similar cleaning device.

The object of this invention is the production of members having special construction and arrangement of parts whereby a meat block can be readily and conveniently cleared, the invention being easy to handle and operate and of such mechanical structure that it will not get out of order.

The construction of this invention is illustrated in the accompanying drawing, of which Fig. 1 represents a side view of this invention resting upon a table or similar support, and showing all parts assembled.

Throughout the drawing and description the same number is used to refer to the same part.

Figure 1:
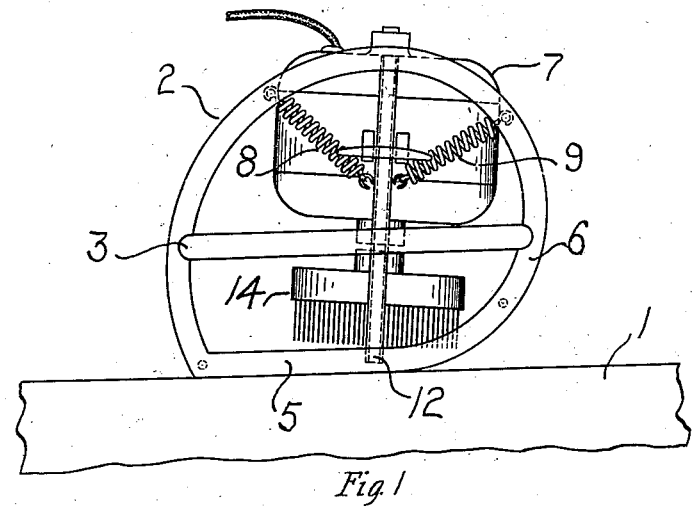

In Fig. 1 a table 1 is shown upon which the invention is resting in the position it would have on a meat block. The construction comprises two side frames 2 and 2' having on the outside the transverse handle bars 3 and 4 whereby the whole may be conveniently moved about on the block by hand.

The side members 2 and 2' constitute the frame of the invention and each side member has a horizontal portion 5 and an upwardly extending curving rear portion 6. The purpose of the construction is to allow the invention to be moved around or about in any direction on the block, or to be tilted or inclined on the curving portions.

Figure 4:
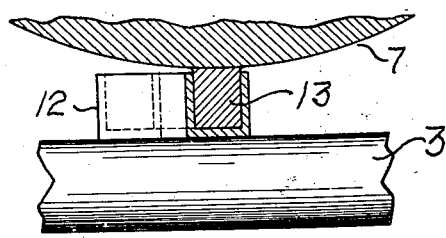
Fig. 4 is an enlarged sectional and fragmentary view of the guiding means for the motor, and the devices provided on the motor to engage the guides.

The motor 7 is carried between the side members on springs 8, 9, 10 and 11, and as shown in Fig. 1 the normal position of the motor is with its shaft inclined slightly. The side members carry the fixed motor guides such as guide 12 in Fig. 4, and the motor is provided with the projections 13 to engage the guides movably. The brush or cleaner 14 is attached to the motor shaft in the usual manner.

The side members are connected in spaced relation by the cross rods 15, 16 and 17, and a rigid frame is thus created enabling the invention well able to withstand any amount of rough usage.

Figures 2, 3:
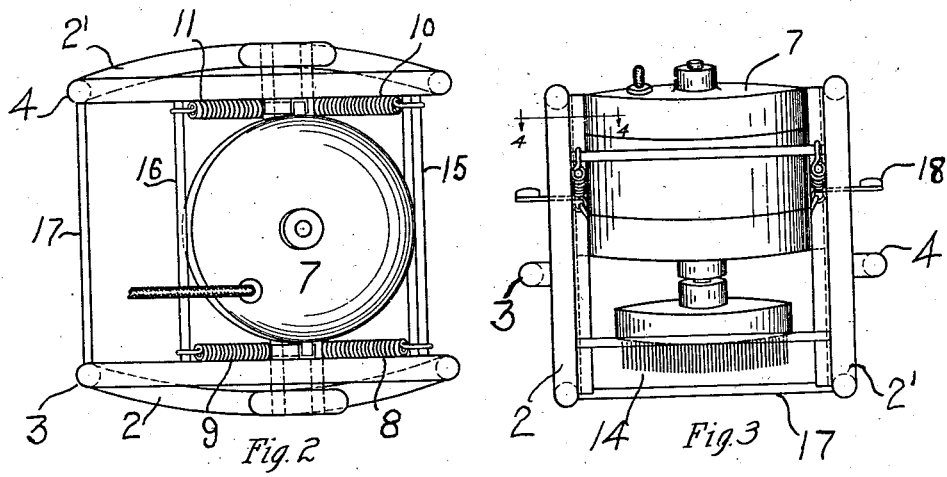
Fig. 2 is a top plan view.
Fig. 3 is an end or rear view from the right hand side of the invention as shown in Fig. 1.

It will be noted in Fig. 1 that the motor axis or shaft is inclined, and in operation the motor and brush may be given any desired inclination forward or backwards or towards either side, and any pressure may be applied to the brush or scraper. The brush shown in this description is rotated by the motor. If desirable the finger pieces 18 shown in Fig. 3 may be used to augment the pressure upon the brush. It is believed to be made out in the drawing and this description that the brush may be given any position in any direction, and any required pressure may be applied whatever the inclination of the motor shaft may be.

Having now described this invention, I claim:

1. A meat block cleaner, comprising a frame consisting of two side members each having a horizontal portion and an upwardly extending portion, each side member having an outwardly projecting hand piece to be grasped by hand, rods arranged to connect the side members in spaced relation, a motor, means for supporting the motor between the side members in adjustable relation, a cleaning device constructed and arranged to be operated by the motor, and said means for supporting the motor being constructed to permit the motor and cleaning device to be moved upwardly and downwardly.

2. A meat block brush, comprising a frame consisting of two side members each having a horizontal portion and an upwardly extending portion, said horizontal portions of each side member being constructed and arranged to extend into upwardly curving portions whereon the frame may be rested movably on a support and tilted thereon, said side members being connected by rods in spaced relation, a motor, springs for supporting the motor resiliently between said side members, said side members having guides for the motor upwardly and downwardly, the motor being provided with devices for engaging the said guides, and a brush arranged to be operated by the motor.

3. A meat block brush, comprising a frame consisting of two side members each having a horizontal portion and an upwardly outwardly curving portion, said horizontal portions of each side member being constructed and arranged to extend into upwardly curving portions whereon the frame may be rested on a support and tilted thereon, said members being connected by rods in spaced relation, said members being provided with handle rods externally, a motor, springs for supporting the motor between said side members resiliently, said side members having guides extending upwardly and downwardly in an inclined direction, the motor being provided with devices for engaging said guides, and a brush constructed and arranged to be rotated by the motor.

LEWIS F. LEFKE.